United States Patent [19]
Underwood

[11] Patent Number: 6,099,615
[45] Date of Patent: Aug. 8, 2000

[54] METHOD FOR IMPROVED PERCOLATION THROUGH ORE HEAPS BY AGGLOMERATING ORE WITH A SURFACTANT AND POLYMER MIXTURE

[75] Inventor: Timothy R. Underwood, Reno, Nev.

[73] Assignee: Golden West Industries, Price, Utah

[21] Appl. No.: 09/039,617

[22] Filed: Mar. 16, 1998

[51] Int. Cl.[7] .............. C22B 1/244; C22B 1/14; C22B 11/00
[52] U.S. Cl. .............. 75/772; 23/313 R; 423/27; 423/29; 423/DIG. 17
[58] Field of Search .............. 423/27, 29, DIG. 17; 75/767, 772, 723; 23/313 R

[56] References Cited

U.S. PATENT DOCUMENTS

| | | | |
|---|---|---|---|
| 3,266,889 | 8/1966 | Duncan et al. | 423/27 |
| 4,400,220 | 8/1983 | Cole, Jr. | 134/18 |
| 4,875,935 | 10/1989 | Gross et al. | 75/117 |
| 4,898,611 | 2/1990 | Gross | 75/3 |
| 4,971,720 | 11/1990 | Roe | 252/313.1 |
| 5,077,021 | 12/1991 | Polizzotti | 423/27 |
| 5,100,631 | 3/1992 | Gross | 423/29 |
| 5,112,582 | 5/1992 | Polizzotti | 423/27 |
| 5,127,942 | 7/1992 | Brierley et al. | 75/743 |
| 5,186,915 | 2/1993 | Polizzotti | 423/29 |
| 5,194,174 | 3/1993 | Roe et al. | 252/173 |
| 5,196,052 | 3/1993 | Gross et al. | 75/712 |
| 5,207,996 | 5/1993 | Sierakowski et al. | 423/24 |
| 5,211,854 | 5/1993 | Liao et al. | 210/734 |
| 5,211,920 | 5/1993 | Polizzotti | 423/29 |
| 5,244,493 | 9/1993 | Brierley et al. | 75/743 |
| 5,246,486 | 9/1993 | Brierley et al. | 75/743 |
| 5,332,559 | 7/1994 | Brierley et al. | 423/27 |
| 5,472,675 | 12/1995 | Polizzotti et al. | 423/1 |
| 5,512,636 | 4/1996 | Polizzotti et al. | 525/285 |
| 5,603,750 | 2/1997 | Sierakowski et al. | 423/29 |
| 5,639,397 | 6/1997 | Roe | 252/88.1 |
| 5,668,219 | 9/1997 | Polizzotti et al. | 525/294 |
| 5,827,348 | 10/1998 | Wadell et al. | 423/41 |

*Primary Examiner*—Steven Bos
*Attorney, Agent, or Firm*—Workman, Nydegger & Seeley

[57] ABSTRACT

A method for improving bacteria and reagent actions on mineral-bearing particles. In the heap leaching process, the method also increases percolation of the leach solution through the heaped ore without the use of high concentrations of cement, high concentrations of high molecular weight polymers, or high concentration of any other binding agents. The method is accomplished by a process comprising the applying of solutions of varying combinations of bacteria, bacterial nutrients, or leaching reagents, together with surface acting agents onto the ore particles before the ore is formed into a heap. The reagents are applied by spray or foggers or foam into the ore as the ore is mined, transported out of the mine, crushed, or transferred to the heap, and before it is formed into the heap.

9 Claims, No Drawings

METHOD FOR IMPROVED PERCOLATION THROUGH ORE HEAPS BY AGGLOMERATING ORE WITH A SURFACTANT AND POLYMER MIXTURE

BACKGROUND OF THE INVENTION

1. The Field of the Invention

The present invention relates to minerals processing. More particularly, the present invention relates to an improved method for distributing chemical reagents, bacteria, or bacterial nutrients into mineral ore. In particular, the present invention relates to a method of distributing reagents onto ore prior to heaping and heap processing thereof.

2. Background

Heap leaching is the leaching of crushed ore, mine strip waste material mill tailings or mine dump material that has been stacked onto an impervious drainage pad to prevent solution losses and pollution of ground waters. Interest in heap leaching, particularly heap and dump leaching has increased in recent years.

During the last two decades, the process of heap leaching of gold and silver has evolved into an efficient method of treating deposits once considered uneconomical. This process has also been used extensively throughout the world to leach oxide copper values from mine strip material from open pit mining of disseminated porphyry copper deposits. Additionally, producers of $U^{308}$ have applied heap leach technology since the late 1950s for extracting uranium from sub run-of-mill grade ores.

Heap leach cyanidation of precious metal ores is a comparatively new development. The U.S. Bureau of Mines metallurgists in 1967 developed this method as a potential low-capital means for processing sedimentary ores containing submicron particles of gold occurring in northern Nevada, USA. Conventional operations well known to those skilled in the art and for purposes of brevity will not be described in detail herein. Such methods are described in: "Silver and Gold Recovery from Low-Grade Resources" by Gene McClelland and S. D. Hill, Mining Congress Journal, 1981, pages 17–23.

Various physical and chemical methods have been employed to increase the distribution of the leach solution as it passes through the heaped ore to minimize blinding and channeling. Channeling occurs when fine ore particles migrate and segregate to an area in the heap, blind off that area of the heap, and force the leach solution to "channel" around that area of the heap. Blinded areas in the heap and the channeling that it causes are undesirable because leaching solution makes no contact with a significant fraction of the heap that resides beneath the blinded area. The agglomeration of fine particles is said to prevent channeling of the leach solution and migration of the fine particles into the channels. U.S. Pat. No. 4,898,611 to Gross, U.S. Pat. No. 5,186,915 to Polizzotti, U.S. Pat. No. 5,472,675 to Polizzotti, et al., and U.S. Pat. No. 5,512,636 to Polizzotti, et al., illustrate the use of high molecular weight polymers and varying ratios of cement/lime for agglomeration of fine ore particles. However cement causes a buffering action which increases the detoxification/reclamation rinsing costs of the heap to return pH levels to original environmental levels. Additionally, the high molecular weight polymers present costly operational problems associated with high water addition requirements, conveyor mudding, and high equipment maintenance cost. U.S. Pat. No. 4,080,419 to Englemann teaches passing a reagent-carrying foam through the already heaped ore in order to leach minerals with decreased amounts of leach solution.

Various physical and chemical methods have been employed to increase the interaction of leach lixiviants or bacteria with heaped ore particles. Some prior art utilizes chemical polymers for agglomeration of ore particles and agglomeration of particles with bacteria. However, as with leaching operations, the polymers present costly operational problems associated with high chemical costs, high water addition requirements, and crusher and conveyor equipment mudding and freezing complications. Other prior art methods of agglomeration utilize cement, lime, and chemical polymers in varying combinations and ratios. However, cement slows down the resumption of pH levels of the heaped ore, back to required environmental levels.

What is needed in the art is a method of agglomerating ore particles without the problems of the prior art. What is also needed in the art is a method of agglomerating ore that does not interfere with biological activity during heap leach treatment. What is also needed in the art is a method of facilitating enhanced ore-lixiviant contact in heap leach treatment. What is also needed in the art is a method of agglomerating ore particles that increases the percolation rate during processing. What is also needed in the art is a method of agglomerating ore particles that improves reagent-ore, and/or bacteria-ore contact for a more efficient process. What is also needed in the art is a method of agglomerating ore particles that avoids the expense of decommissioning a heap that is known in the prior art.

SUMMARY AND OBJECTS OF THE INVENTION

The present invention relates to a method of improved ore-reagent contact in heap or dump leach operations. The method includes contacting the ore with a surfactant before building a lift. A first general embodiment relates to a method for improved reaction of bacteria and their reagents on heaped ore particles, comprising contacting the ore with a surfactant solution containing the bacteria, bacterial nutrients, and reagents. The contacting method is carried out during crushing, agglomerating, ore handling, or a combination thereof. Applying this solution to the ore before the ore is heaped is usually done as the ore is crushed and transported by conveyor. Thereby, the bacteria, and bacterial nutrients can be efficiently distributed onto the ore particles with the surfactant.

In a preferred embodiment, foaming agent is added to a solution containing bacteria, bacterial nutrients, and their reagents and is foamed. This solution is then applied onto the ore before it is formed into a heap. This solution is typically applied to the ore as it is moved across transfer points, injected into the ore as it is crushed, or both.

A second general embodiment of the present invention relates to a method for improved reaction of chemical reagents on heaped ore particles, comprising contacting the ore with a reagent solution that contains a surfactant. This solution is applied to the ore before the ore is heaped such as while the ore is crushed or transported by conveyor. Thereby, the reagents and surfactant are efficiently distributed onto the ore particles. This method of introducing chemical reagents into the ore can also be carried out while the ore is being agglomerated.

The second general embodiment provides a method for incorporating a surfactant into heaped mineral-bearing ores for chemical treatment. Applying chemical reagents, in combination with surfactants, to fragmented ore before forming the ore into a heap, increases the activity of the chemical reagents on the agglomerated ore particles.

In a preferred embodiment, surfactant is added to chemical reagents in a solution. This solution is then contacted with the ore before it is formed into a heap. The solution is then applied to the ore as set forth in the first general embodiment.

An example of the inventive method relates to distribution of surfactants onto ore particles, comprising a foam generating system. The system is used to mix a dilute solution of surfactant in water with gas, usually compressed ambient air, and to apply the foam to the ore before the ore is heaped. Application of foam is usually done as the ore is crushed or transported by conveyor. This application efficiently distributes the surfactant and regents onto the ore particles and agglomerates the fine particles to themselves and other larger particles. This method of introducing surfactant into the ore and agglomerating fine ore particles is shown to be a low cost method of increasing percolation of leach solution through mineral ore.

The foam is also applied to fine particles as the particles experience more mechanical action. The foam can also be applied to fine particles collected by baghouses or other dust collection equipment.

Accordingly, when one of ordinary skill in the art reviews the first embodiment of the inventive method and the above-presented examples, it can be seen that a simple method has been provided that utilizes surfactants to increase the activity of bacteria and reagents on mineral ore particles by improving solution-to-ore contact and increasing percolation rates. The method described also provides agglomeration of fine ore particles, reduces ponding and channeling of the leaching solution, improves percolation rate of the leaching solution and rinsing of decommissioned ore heaps.

The second embodiment of the inventive method is also shown to be a low cost method of increasing reactions on the ore particles by the chemical reagents. The inventive method is also shown to enhance percolation of leach solution through heaped ore without the complications caused by the use of conventional agglomeration reagents.

According to a third embodiment of the present invention, surfactant or foaming agent is mixed with an extremely low concentration of polymer to create a foam. By this embodiment, polymer is used with surfactant or other foaming agent to create a foam that reduces the requirement of surfactant.

Accordingly, it is an object of the present invention to provide a method for improved distribution of surfactants onto ore particles to decrease blinding, ponding, and channeling in the heaped ore.

It is still another object of the present invention to provide a method for improved distribution of reagents onto ore particles to improve bacterial growth and reactions on the ore particles. It is another object of the invention to provide a simple method for improved leaching of agglomerated ore particles and improved interaction of bacteria with agglomerated and heaped ore particles. It is still another object of the invention to provide a method for improved distribution of surfactants and bacteria onto ore particles. It is still another object of the invention to provide a method for improved application of bacteria onto ore particles to improve bacterial oxidation of the ore particles.

It is also an object of the present invention to provide a method for improved distribution of reagents onto ore particles to increase leaching of minerals from these particles. It is still another object of the invention to provide a method for improved distribution of reagents onto ore particles to decrease blinding and channeling in the heaped ore by agglomerating fine particles without the expensive complications of polymer and/or cement use. It is still another object of the invention to provide a method for improved distribution of reagents onto ore particles to improve heaped ore permeability and percolation rates of the leaching solution. It is also an object of the present invention to provide a method for improved distribution of reagents properties into heaped ore to reduce ponding and channeling of the leach solution in the heaped ore.

It is still another object of the invention to provide a method for improved distribution of reagents into heaped ore to improve rinsing and detoxification of decommissioned ore heaps. It is still another object of the invention to provide a method for improved percolation through heaped ore that improves rinsing and detoxification of decommissioned ore heaps.

It is still another object of the invention to improve foam quality and lower foaming agent weights by adding high molecular weight polymer in a small ratio to the foaming agent.

These and other objects and features of the present invention will become more fully apparent from the following description and appended claims, or may be learned by the practice of the invention as set forth hereinafter.

DETAILED DESCRIPTION

The present invention relates to a method of improved ore-reagent contact in heap or dump leach operations. The method includes contacting the ore with a surfactant or foaming agent before building a lift. By "surfactant" it is understood that it is a composition of matter that is a surface acting agent or that will cause the surface tension in a liquid to be lowered. By "foaming agent" it is understood that it is a composition of matter that can be foamed. Where the term "surfactant" or "foaming agent" is used, it is understood that the two are interchangeable although a foam may not be generated in some applications. When applied to heap leach technology, ore samples are constructed with the dissolved surfactant to a total moisture content in the ore from about 0.1 to about 16% or higher such as 20%, preferably from about 2 to about 12%, and most preferably from about 6% to about 8%. For ore to be milled, the moisture content can be increased until it is formed into a pulp.

A first general embodiment relates to a method for improved reaction of bacteria and their reagents on heaped ore particles, comprising contacting the ore with a surfactant solution containing the bacteria, bacterial nutrients, and reagents. The contacting method is carried out during crushing, agglomerating, ore handling, or a combination thereof. Applying this solution to the ore before the ore is heaped is usually done as the ore is crushed and transported by conveyor. Thereby, the bacteria, and bacterial nutrients can be efficiently distributed onto the ore particles with the surfactant. This method of introducing bacteria and their reagents into the ore is also preferably carried out while the ore is being agglomerated. The present invention provides a method for incorporating a surfactant into heaped mineral-bearing ores. It has been discovered that applying bacteria and reagents, in combination with surfactants, to fragmented ore before forming the ore into a heap, increases the activity of the bacteria and reagents on the agglomerated ore particles.

In a preferred embodiment, surfactant is added to a solution containing bacteria, bacterial nutrients, and their reagents. This solution is then applied onto the ore before it is formed into a heap. The solution can be applied as a liquid spray such as from a nozzle, a perforated spray head, and the like. The solution can be applied with a small droplet fogger such as an atomizer, a bubbler, and the like. The solution can be applied as a foam including "wet" foam, "dry" foam, and the like. A "wet" foam is defined as a foam that has a freshly-manufactured head of foam that, upon complete collapse, has a liquid height of about one-tenth to one-fifteenth the freshly-manufactured head of foam. A "dry" foam is defined as a foam that has a freshly-manufactured head of foam that, upon complete collapse, has a liquid height of less than about one-twentieth the freshly-manufactured head of foam, preferably less than about one-thirtieth the freshly-manufactured head of foam, and most preferably less than about one-one hundredth the freshly-manufactured head of foam. This solution is typically applied to the ore as it is moved across transfer points, injected into the ore as it is crushed, or both.

Bacteria, their nutrients, the surfactant and other reagents are applied by injecting the solution into crushers along with the aggregate, into free falling aggregate at transfer points between belts, onto the aggregate as it is transported on belts, or any subcombination of the three. The bacterial strain may be selected from the group consisting of thiobacillus ferrooxidans, thiobacillus thiooxidans, thiobacillus organoparus, thiobacillus acidophilus, and the like. The bacterial strain may also selected from leptospirillum ferooxideans and the like. The bacterial strain may also be selected from the group consisting of sulfobacillus thermosulfidooxidans, sulfolobus acidocaldarius, solfolobus BC, sulfolobus sulfataricus, and the like. Although the above bacterial strains are set forth, they are not intended to be limiting of the present invention.

The mechanical action of the aggregate will agglomerate the fine particles to each other and to larger particles. The reagent solution can also be applied to fine particles collected at baghouses or other dust collection equipment by any of the aforementioned method types. In these applications, the fine particles agglomerate and can be returned to the conveyor system for transport to the ore heap. Typical agglomeration techniques are described by U.S. Pat. No. 4,400,220 to Cole and U.S. Pat. No. 4,971,720 to Roe and the methods set forth therein are incorporated into this description by specific reference.

A second general embodiment of the present invention relates to a method for improved reaction of chemical reagents on heaped ore particles, comprising contacting the ore with a reagent solution that contains a surfactant. This solution is applied to the ore before the ore is heaped such as while the ore is crushed or transported by conveyor. Thereby, the reagents and surfactant are efficiently distributed onto the ore particles. This method of introducing chemical reagents into the ore can also be carried out while the ore is being agglomerated.

The second general embodiment provides a method for incorporating a surfactant into heaped mineral-bearing ores for chemical treatment. Applying chemical reagents, in combination with surfactants, to fragmented ore before forming the ore into a heap, increases the activity of the chemical reagents on the agglomerated ore particles.

In a preferred embodiment, surfactant is added to chemical reagents in a solution. This solution is then contacted with the ore before it is formed into a heap. The solution is then applied to the ore as set forth in the first general embodiment.

Because surfactants are water soluble, it is a preferred embodiment of the present invention to recharge the ore heap leach solution with additional surfactant. Additionally, surfactant can become weakened by contact with the ore and the specific reagents. To this end, surfactants in the heap leach solution are supplemented with additional surfactant. The specific amount of supplemental surfactant will be site specific.

A first general example includes foaming of ore by metering surfactant into a fresh water line. The surfactant concentration range is from about 0.001 to about 10%, preferably from about 0.01 to about 10%, more preferably from about 0.1 to about 0.5%, and most preferably about 0.2%. Foaming may be carried out by using a non-ionic surfactant, anionic surfactant, cationic surfactant, or a foaming agent.

After dilution of the surfactant into the fresh water line, compressed air is injected into the line. The air injection point is preferably a distance before the foam generation chamber of less than about 1 meter, more preferably between about 10 cm and about 50 cm, and most preferably between about 1 cm and 5 cm. Additionally, air may be injected directly into the chamber.

Foam is injected into the ore particles in a variety of ways. Foam is injected into ore particles as they fall through a grizzly. Foam is injected into the grizzly oversize particles as they are crushed. Foam is injected into the ore particles as the undersize and now crushed oversize are combined. Additionally, foam is injected into the crusher where the crusher has an agglomerating effect upon all particles passing therethrough. Additionally, foam is injected into the ore by any other manner without crushing such as by injecting the foam on the ore from mobile or transporting equipment such as a bucket loader or haul truck, or other transport equipment. Additionally, foam may be applied to the ore by any manner before forming the ore into a heap. Following injection of surfactant-containing foam into the ore particles, the ore may be transferred by use of a belt system to create a lift.

In an alternative of the first general example, surfactant is applied to ore particles within the crusher and at transfer points along the belt system to both crushed particles and grizzly undersize particles to create a total moisture content in the ore of about 6% to about 8%. Surfactant concentration in the solution is, by way of non-limiting example, about 0.1% of the solution. Following the formation of a lift, additional surfactant is sprayed upon the lift in a mixture with the ore reagents such as chemical or biological reactants or a combination thereof. According to this alternative of the first general embodiment example, surfactant is applied in a first measure so as to sufficiently coat the ore particles and then a second measure of surfactant is applied to about double the amount of surfactant in the heap. The second measure of surfactant is the same surfactant or a substantially chemically similar surfactant that is applied with the appropriate reactant. In this manner, the appropriate reactant is in solution with the same or substantially similar surfactant that coats the ore particles and reactant-ore contact is enhanced due to the wetting of the second one-half portion of the surfactant mixed with the appropriate reactant. Optionally, a third measure of surfactant is metered into the leaching solution during the life of the leach to maintain optimum reagent-ore contact and to supplement surfactant depletion and dilution.

In another example, a set of two columns were charged with twenty kilograms each of ore particles. The ore particles' size was 100% passing ¼-inch. The column diameter was 4 inches and the solution rate applied to the top of the column was 0.005 gal/min ft². In the column that was prepared according to the present invention, the ore particles were first agglomerated with a foamed surfactant comprising about 0.2% surfactant in the agglomeration solution.

"Breakthrough" is defined as the event when moisture has percolated entirely through the column charge or heap and is exiting the column charge or heap at a rate greater than about 90% of the feed rate to the top of the column or heap. For the column that was prepared according to the method of the present invention, breakthrough was about one day (i.e., overnight or less than 24 hours, e.g. about 12 hours) and moisture content in the column at the time of breakthrough was about 6%. For the control column, breakthrough was after about five days, and the moisture content in the column at the time of breakthrough was about 30%. It can be seen by these data, that water requirements when using the inventive method are reduced to about 80%, preferably about 50%, and most preferably about 25% of that required in the prior art. It can also be seen that processing times according to the inventive method will be less than 50%, preferably less than about 25%, and most preferably less than about 20% the processing times required in the prior art.

According to a preferred embodiment of the present invention, breakthrough occurs according to a percolation rate of about 1 cm/hr, more preferably about 3 cm/hr, even more preferably about 4 cm/hr, and most preferably about 5 cm/hr. Where particle sizes exceed minus ¼-inch, percolation rates as high as from 10 cm/hr to 100 cm/hr can be attained according to the inventive method while avoiding blinding, ponding, and channeling. Additionally, according to a preferred embodiment of the present invention, the moisture content in a lift at the time of breakthrough is about 25% of total weight, preferably about 20%, more preferably about 15%, even more preferably about 10%, and most preferably about 5%.

In another example, a set of two columns is charged with 20 kilograms each of ore particles that contain gold and silver mineral values. The ore particles' size is 100% passing ¼-inch. The column diameter is 4 inches and the solution rate applied to the top of the column is 0.005 gal/min ft². In the column that is prepared according to the present invention, the ore particles are first agglomerated with a surfactant comprising about 0.2% surfactant in the agglomeration solution. In the control column, ore particles are agglomerated with an amount of moisture equivalent to that in the column that is prepared according to the present invention without the presence of any surfactant. Breakthrough occurs in the column that is prepared according to the present invention after about 12 hours. Breakthrough occurs in the control column after a period of about 5 days. The moisture content in the column that is prepared according to the present invention is about 6% at breakthrough and the moisture content in the control column is about 30% at breakthrough. Additionally, percolation of leaching reagent through each column comprising NaCN reveals higher mineral value extraction from the column that is prepared according to the present invention when compared to the control column.

Equivalent volumes of leach liquid are passed through each column. However, the volume of leach liquid that is passed through the column is prepared according to the method of the present invention, passes through its column in approximately ⅕th the time required in the control column. After equivalent volume contact of leach liquid through the controlled column has been completed, recovery of gold is approximately 20% greater in the inventive column method than in the control column and recovery of silver is approximately 5% greater.

Another example relates to a method for improved distribution of surfactants onto ore particles, comprising a foam generating system. The system is used to mix a dilute solution of surfactant in water with gas, usually compressed ambient air, and to apply the foam to the ore before the ore is heaped. Application of foam is usually done as the ore is crushed or transported by conveyor. This application efficiently distributes the surfactant onto the ore particles and agglomerates the fine particles to themselves and other larger particles. This method of introducing surfactant into the ore and agglomerating fine ore particles is shown to be a low cost method of increasing percolation of leach solution through mineral ore.

As compared to reagents applied to the heap in the conventional manner, the inventive method of application is advantageous in that it provides better distribution of reagents into the ore, as will become clearer from a further consideration of the invention.

Foam is applied by injecting it into free falling aggregate at transfer points between belts. Foam is also injected into crushers along with the aggregate. Additionally, foam is applied in both crushers and at transfer points. The mechanical action of the aggregate will burst the foam bubbles. To aid in fine particle contact, foam application is more effective when applied onto the aggregate before aggregate mixing. As the moving particles burst the foam bubbles, gas in the bubble escapes, the bubble implodes, and the liquid film of which the bubble was made coats and wets the particles. The wetted particles will also come together or agglomerate with other particles as they experience more mechanical action.

The foam is also applied to fine particles as the particles experience more mechanical action. The foam can also be applied to fine particles collected by baghouses or other dust collection equipment. In these applications, the fine particles agglomerate and can be returned onto the conveyor system for leaching. Typical foam injection and production techniques are also described by U.S. Pat. No. 4,400,200 to Cole and U.S. Pat. No. 4,971,720 to Roe.

In another example, foam production for pilot testing was accomplished by metering surfactant into a fresh water line at a concentration of about 0.2% active surfactant. Higher concentrations of foam surfactant can be utilized for a lighter density foam that is drier if ore becomes too wet for a conveyor system or other equipment. The reagent to be foamed in this test was a mixture of anionic and non-ionic surfactants and is not to be construed as limiting the scope of the invention.

After dilution of the foaming surfactant into the water line, compressed air was injected into the line. To allow comparison of percolation rates of foam-treated ore versus non-foam treated ore, lab scale pilot columns were utilized. Pilot columns were constructed of three inch inner diameter polyvinylchloride pipe. Pilot columns were capped at the bottom end with drain holes formed in the cap. The columns were supported vertically on stands. To simulate blinding of a heap by minus 100-mesh particles, the test samples were taken from baghouse collected gold and silver ore dust collected from a baghouse auger. For the tests, 3.7 kilogram samples were air dried. Ore fractions were combined and blended by techniques such as coning and quartering such that each column contained a substantially similar ore-to-mineral-value content and ore size distribution.

To account for the moisture in the foam, an 8.8 milliliter volume of water was added to the 3.7 kilogram ore sample in the control column. This moisture was added as a fine mist as samples were poured back and forth, between empty buckets. This simulated conveyor belt transfer points and supplied the required agglomerating action.

Leaching solution was made by dissolving lime in distilled water to achieve a 10.2 pH solution. Sodium cyanide (NaCN) was added to this solution to achieve a concentration of 1.2 pounds per ton of NaCN in water.

Equal amounts of the leach solution was added to the top of each column. To avoid disturbing the particles as the water was added, a 10-micron filter was placed on the top surface of the samples. Due to the particle sizes in the samples, the water addition caused a standing water column on top of the ore sample. This gave an equal initial head pressure. Downflow rates of the solutions through the columns were then measured. Percolation results are seen in Table 1.

TABLE 1

Percolation Rate Data

| Test | Foam Treated Column, $cm^3/hr$ | Control Column, $cm^3/hr$ |
|---|---|---|
| 1 | 7.2 | 3.4 |
| 2 | 4.9 | 2.2 |
| 3 | 6.8 | 2.2 |
| 4 | 6.6 | 2.9 |

A review of percolation data set forth in this specification reveals a correlation, when using the invented method, between ore particle size and percolation rates. For example, when the ore particle size is 100% minus ¼-inch (0.634 cm), the linear downward percolation rate is in a range from about 1 cm/hr to about 5 cm/hr. In particular, the linear percolation rate was about 4.3 cm/hr. When the ore particle size is 100% minus 100-mesh (0.015 cm), the linear percolation rate is in a range from about 0.08 to about 0.2 cm/hr. In particular, the linear percolation rate for this mesh size was between 0.11 and 0.16 cm/hr. For a minus ¼-mesh particle size, the percolation rate according to the inventive method was higher than that seen in the prior art by a factor of about 1.5 to about 3, more particularly about 2. For a minus 100-mesh particle size, the percolation rate according to the inventive method was higher than that of the prior art by a factor in a range from about 2 to 10, in particular about 5.

A third general embodiment of the present invention relates to a method for improved reaction of either biological or chemical reagents on heaped ore particles, comprising contacting the ore with a reagent solution that contains a foaming agent or surfactant and a small portion of polymer. This solution is applied to the ore before the ore is heaped such as while the ore is crushed or transported by conveyor. Thereby, the reagents and polymer-assisted surfactant are efficiently distributed onto the ore particles. This method of introducing biological or chemical reagents into the ore can also be carried out while the ore is being agglomerated.

In the third general embodiment, it has been found that polymer may be added to the surfactant or foaming agent in extremely small amounts such as about 1% of the total surfactant or foaming agent. In a first example, three grams of surfactant plus 0.03 grams of polymer was added to 2,000 ml of water and was foamed. In a second example of this third general embodiment, 2.5 grams of surfactant was mixed with 0.05 grams of polymer and diluted into 2,000 ml of water and then foamed. In comparison, substantially similar foaming by volume was accomplished by mixing five grams of surfactant with no polymer in 2,000 ml of water and foamed. The polymer can be non-ionic, anionic, or cationic.

It was a surprising result to find that the quality and amount of foam was substantially the same in the first two examples as it was in the comparative example. Due to this discovery, it is now clear that the cost of agglomerating according to the inventive method will be approximately one-half of that when using a surfactant or foaming agent without the aid of a polymer. Further, polymer usage according to the prior art caused high cost operational problems associated with high water addition requirements, conveyor mudding, and high-cost equipment maintenance. The third general embodiment of the present invention overcomes these problems. It lowers cost and water requirements and creates a surprisingly high quality foam that is substantially comparable to a foam generated with a surfactant or foaming agent alone but requiring about twice the surfactant.

According the third general embodiment, a polymer with a molecular weight greater than about 1,000 is used in connection with the surfactant. Preferably, a polymer with a molecular weight greater than about 3,000,000 is used in connection with the surfactant. More preferably, a polymer with a molecular weight greater than about 10,000,000 is used in connection with the surfactant. Most preferably, a polymer with a molecular weight of about 30,000,000 is used in connection with the surfactant.

According to this embodiment, a composition of matter is disclosed in which the surprising result was that a foam was generated that had the same approximate bubble size and total volume as what was produced according to the first two general embodiments. Accordingly the composition of matter has a carrier. The carrier is selected from the group consisting of purified water, culinary water, irrigation water, spring water, runoff water, mine process water, recycled water, and the like. The composition of matter has a surfactant or foaming agent. The surfactant or foaming agent has a concentration in the same ranges as in the first two general embodiments, albeit the ranges in this embodiment are approximately one half. Hence the surfactant or foaming agent is in a concentration range from about 0.0005% to about 5% of the carrier. The polymer is in a polymer-to-surfactant ratio in a range from about 0.001:1 to about 1:1. Preferably, the polymer is in a polymer-to-surfactant ratio in a range from about 0.005:1 to about 0.1:1. Most preferably, the polymer is in a polymer-to-surfactant ratio in a range from about 0.01:1 to about 0.04:1.

The composition of matter is capable of making a foam of bubble size and total foam volume as a composition without a polymer as set forth in the first two general embodiments. The surprising advantage is that approximately half the amount of surfactant is needed when the polymer additive is used. The composition of matter is particularly useful when it is foamed because about the same volume and quality of foam is created with approximately half the amount of surfactant.

Accordingly, when one of ordinary skill in the art reviews the first embodiment of the inventive method and the above-presented examples, it can be seen that a simple method has been provided that utilizes surfactants to increase the activity of bacteria and reagents on mineral ore particles by improving solution-to-ore contact and increasing percolation rates. The method described also provides agglomeration of fine ore particles, reduces ponding and channeling of the leaching solution, improves percolation rate of the leaching solution and rinsing of decommissioned ore heaps. This method is performed without the expensive complications of chemical polymers, cement, or other binding agents. While it is believed that the increased chemical reaction rates occur because there is more efficient distribution of the sprayed bacteria and their reagents onto the ore particles, and the lowered interfacial tension upon the ore particles due to the surfactant action, there is no intention to be bound by this theory.

The inventive method is shown to be a low cost method of increasing reactions on the ore particles. The inventive method is also shown to enhance percolation of leach solution through heaped ore without the complications caused by the use of high molecular weight chemical polymers.

As compared to reagents applied to the heap in the conventional manner, the inventive method of application is advantageous in that it provides better distribution of bacteria and their reagents onto the ore particles, and the surfactant improves the activity of the bacteria and reagents on the ore particles.

The second embodiment of the inventive method is also shown to be a low cost method of increasing reactions on the ore particles by the chemical reagents. The inventive method is also shown to enhance percolation of leach solution through heaped ore without the complications caused by the use of high molecular weight chemical polymers and/or cement.

As compared to reagents applied to the heap in the conventional manner, the inventive method of application is advantageous in that it provides better distribution of chemical reagents onto ore particles, and the surfactant improves the activity of the chemical reagents on the ore particles.

According to the third embodiment, a simple method of distributing reagents into mineral ores to increase reactions in the ore, and extraction of minerals from the ore has been demonstrated. The method described also provides agglomeration of the fine particles, reduces ponding and channeling of the leach solution, improves percolation rate of the leaching solution and rinsing of decommissioned ore heaps. This method is performed with minimal water addition, crusher equipment plugging and with surprising foaming results without the expensive complications of high concentration chemical polymer and/or cement use.

The third embodiment of the inventive method is also a low cost method of increasing reactions on the ore particles by the chemical reagents. The inventive method is also shown to enhance percolation of leach solution through heaped ore without the complications caused by the use of high concentrations of high molecular weight chemical polymers and/or cement.

As compared to reagents applied to the heap in the conventional manner, the inventive method of application is advantageous in that it provides a foam of substantially equal or better quality as set forth in the first and second embodiments.

According to the third embodiment, a simple method of distributing reagents into mineral ores to increase reactions in the ore, and extraction of minerals from the ore has been demonstrated. The method described also provides agglomeration of the fine particles, reduces ponding and channeling of the leach solution, improves percolation rate of the leaching solution and rinsing of decommissioned ore heaps. This method is performed with minimal water addition, approximately half the surfactant requirement, and without the expensive complications of conventional amounts of chemical polymer.

While particular embodiments of the invention have been described, and although the present invention is described particularly for heap leach operations, the present invention may also be applied to ore to be crushed, crushed ore, run-of-mine ore, screened run-of-mine ore, ore to be heaped and ore to be milled.

While particular embodiments of the invention have been described, modifications and variations thereof will occur to those skilled in the art. It is to be understood, therefore, that the appended claims are intended to cover such modifications and variations that are within the true scope and spirit of the invention.

What is claimed and desired to be secured by United States Letters Patent is:

1. A method of improving percolation of heap leach liquid through a lift comprising:
    mixing a surfactant in a first quantity with a polymer in a second quantity in a diluent liquid to obtain a first solution consisting essentially of said surfactant and said polymer in said diluent liquid, wherein:
        said surfactant is in a concentration range from about 0.001% to about 10%; and
        said polymer is in a polymer-to-surfactant ratio in a range from about 0.001:1 to about 0.1:1;
    applying said first solution to ore particles:
    agglomerating said ore particles;
    building said ore particles into a lift;
    contacting said lift with a second solution and
    percolating said second solution through said lift at a rate from about 1 cm/hr to about 100 cm/hr.

2. A method of improving mineral value recovery in a heap comprising:
    mixing a surfactant in a first quantity with a polymer in a second quantity in a diluent liquid to generate a foam consisting essentially of said surfactant and said polymer in said diluent liquid, wherein said polymer is in a polymer-to-surfactant ratio in a range from about 0.001:1 to about 0.1:1;
    mixing a bacterial strain with said foam;
    applying said foam to ore particles;
    agglomerating said ore particles;
    building said agglomerated ore particles into a lift;
    contacting said lift with at least one reagent; and
    dissolving said mineral values with said at least one reagent.

3. A method of improving wetting of ore particles comprising:
    mixing a surfactant in a first quantity with a polymer in a second quantity in a diluent liquid to obtain a solution consisting essentially of said surfactant and said polymer in said diluent liquid, wherein said polymer is in a polymer-to-surfactant ratio in a range from about 0.001:1 to about 0.1:1;
    applying said solution to ore particles;
    agglomerating said ore particles; and
    contacting said ore particles with at least one composition.

4. A method of improving wetting of ore particles according to claim 3, wherein said polymer is in a polymer-to-surfactant ratio in a range from about 0.005:1 to about 0.1:1.

5. A method of improving wetting of ore particles according to claim 3, wherein said polymer is in a polymer-to-surfactant ratio in a range from about 0.01:1 to about 0.04:1.

6. A method of improving wetting of ore particles according to claim 3, wherein said polymer is in a polymer-to-surfactant ratio of 0.05 parts polymer to 2.5 parts surfactant.

7. A method of improving wetting of ore particles according to claim 3, wherein said polymer is in a polymer-to-surfactant ratio of about 1:25.

8. A method of improving wetting of ore particles according to claim 3, wherein said polymer is in a polymer-to-surfactant ratio of about 1:100.

9. A method of improving wetting of ore particles according to claim 3, prior to applying said solution to ore particles, further comprising:

generating a foam of said polymer, said surfactant, and said diluent liquid;

wherein applying said solution to ore particles further comprises applying said foam to said ore particles.

* * * * *

UNITED STATES PATENT AND TRADEMARK OFFICE
CERTIFICATE OF CORRECTION

PATENT NO. : 6,099,615
DATED : August 8, 2000
INVENTOR(S) : Timothy R. Underwood It is certified that error appears in the above-identified patent and that said Letters Patent is hereby corrected as shown below:

Column 3,
Line 15, after "and" change "regents" to -- reagents --

Column 10,
Line 21, after "According" insert -- to --

Column 12,
Line 60, after "said" insert -- agglomerated --

Signed and Sealed this

Sixteenth Day of October, 2001

Attest:

*Nicholas P. Godici*

NICHOLAS P. GODICI
*Attesting Officer*     *Acting Director of the United States Patent and Trademark Office*